May 29, 1956 M. P. LAURENT 2,747,600
VALVE LUBRICATING SYSTEM
Filed March 13, 1952
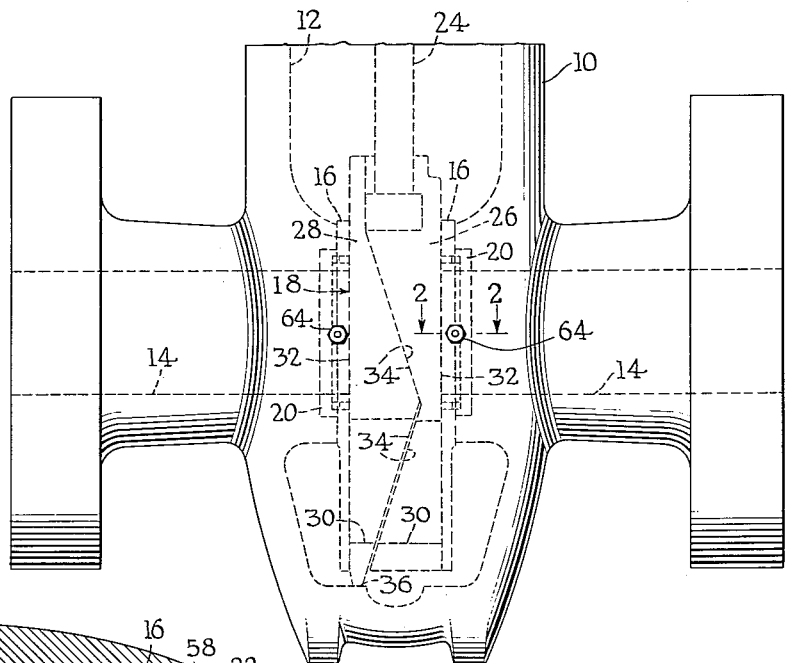
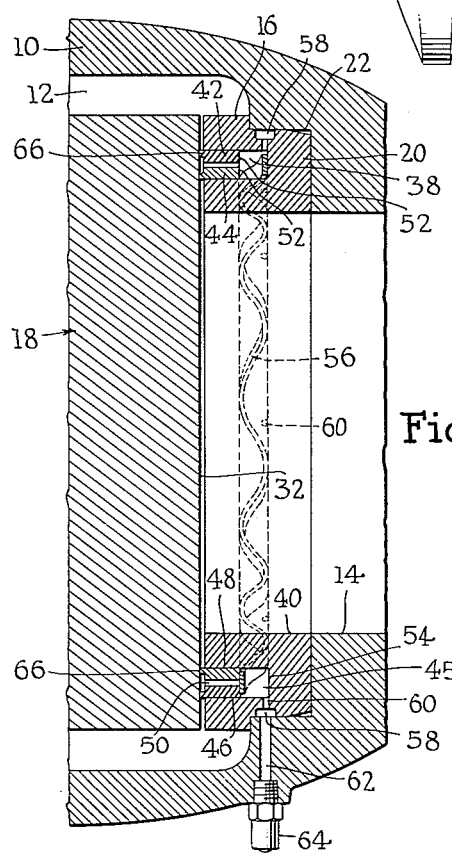
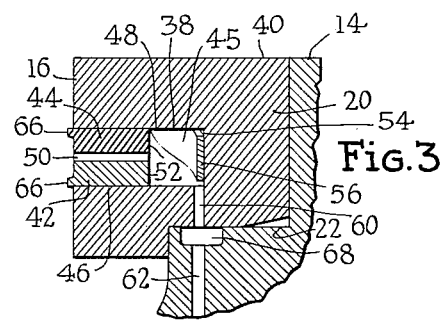
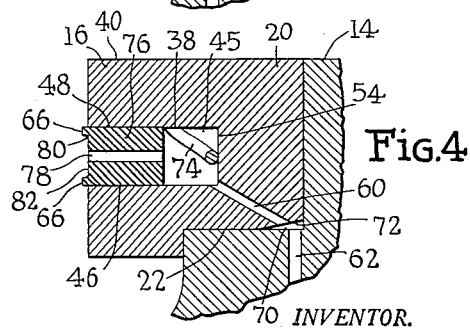
INVENTOR.
Milton P. Laurent
BY
*Attorney*

United States Patent Office 2,747,600
Patented May 29, 1956

2,747,600

VALVE LUBRICATING SYSTEM

Milton P. Laurent, Houston, Tex., assignor, by mesne assignments, to W-K-M Manufacturing Company, Inc., a corporation of Delaware Application March 13, 1952, Serial No. 276,278

15 Claims. (Cl. 137—246.22)

This invention relates to valve lubrication systems and more particularly to systems for supplying lubricant to and maintaining lubricant on the valve sealing surfaces.

The invention will be described with reference to gate valves, and especially to through conduit gate valves having an expansible gate, but it will be understood that the invention is also applicable to other types of valves. By through conduit is meant a valve which, when open, presents an unbroken smooth-walled conduit for uninterrupted passage of fluid therethrough.

Valve working or sealing surfaces which have sliding or wiping contact frequently are supplied with thick viscous grease not only for lubricating purposes but also for sealing purposes. A film of such grease between valve sealing surfaces fills minute crevices and imperfections therein and enables a valve to operate under much higher pressures without serious leakage.

At present, grease is supplied to valve sealing surfaces in several ways. The most common way is by relatively wide lubricant grooves in one or both of the surfaces so that wiping contact between the surfaces spreads the grease thereover. Another method is by what may be termed a closed lubricant groove, i. e. a groove in one of the surfaces that has a floating insert fitted with a narrow machined clearance therein. Lubricant is introduced to the groove behind the insert and extrudes through the narrow clearance to the sealing surfaces. Still another method, frequently employed for through conduit gate valves, is to fill the entire valve housing with grease.

All of these methods have disadvantages and advantages. The plain or open type of lubricant groove has the lubricant therein diluted or washed away by the fluid being controlled by the valve, since in the opening and closing movements thereof the open groove is exposed to such fluid. Additionally, the open groove has a tendency to collect and retain dirt, scale, sediment, and other forms of abrasive matter which not only enter between sealing surfaces and prevent their proper seating with resulting leakage, but also mar and score the finish of the sealing surfaces for ultimate leakage. The open groove, however, possesses the advantage of holding a relatively large volume or mass of grease directly against one of the sealing surfaces. It also permits the surfaces to be lubricated, by the forcing of grease under pressure therebetween, before a valve is opened or closed, the latter only in some instances, e. g. in the case of a through conduit gate valve.

The closed type of groove has the advantage of keeping dirt, scale, sediment, etc. out of the grease, and of scraping such foreign matter off the sealing surfaces by the wiping action of the insert against one of such surfaces. Additionally, automatic lubrication of the surfaces is had by the pumping action of the insert as the valve is operated. In this construction, however, the possibility of holding a large mass of grease against one of the sealing surfaces obviously is precluded. Further, forced lubrication is practically impossible when the sealing surfaces are in tight contact. Also in the closed type of groove it is possible to build up sufficient lubricant pressure in the groove to force the insert therein so tightly against the opposed sealing surface that the valve binds, that is, the frictional drag between the insert and the opposed sealing surface becomes excessive.

Obviously the packed housing method of lubrication, while satisfactory in some instances, is wasteful of grease and also precludes forced lubrication.

Hence, it is an object of this invention to provide an improved valve lubrication system which combines the advantages of both the open and closed groove systems but possesses the disadvantages of neither.

It is another object of this invention to provide an improved valve lubrication system which enables a relatively large mass of lubricant to be held directly against one of the valve sealing surfaces and also has means for scraping or wiping such surface during the movements of the valve member.

It is another object of this invention to provide an improved valve lubrication system similar in many respects to the closed groove type, but in which the possibility of high lubricant pressure binding the valve is materially reduced.

Other objects and advantages of the invention will be evident from the following description and accompanying drawings, in which:

Figure 1 is a fragmentary side elevational view of a through conduit gate valve embodying this invention, Figure 2 is an enlarged fragmentary sectional view taken on line 2—2 of Figure 1, Figure 3 is an enlarged fragmentary view corresponding to a portion of Figure 2, but showing a modification of the invention, and Figure 4 is a view corresponding to Figure 3 showing another modification of the invention.

Referring now to the drawings, there is shown in Figure 1 a gate valve having a housing 10 forming a valve chamber 12 provided with aligned ports 14 in opposite walls thereof. The ports 14 are provided, at their inner ends, with opposed parallel flat-faced valve seats 16 between which the gate mechanism 18 of the valve is confined and guided for substantially rectilinear movement. The seats 16 preferably are constructed as removable inserts having annular portions 20 which have a pressed fit in counterbores 22 at the inner ends of the ports 14. The upper portion of the housing 10 is of known construction, having a bonnet (not shown) through which extends a valve operating stem 24 for raising and lowering the gate mechanism 18 to open and close the valve.

The ported valve gate mechanism 18, which slides between the seats 16, is formed in two sections, one herein termed the gate 26 and the other the segment 28 (see Figure 1). Both sections 26 and 28 have ports 30 which in the open position of the gate assembly 18 are aligned with the housing ports 14 to form a smooth walled passageway for unobstructed flow of fluid through the valve. The valve stem 24 is connected to the gate 26, rectilinear movement of which by the stem carries the segment 28 along as a unit, as later described.

The gate 26 and segment 28, when assembled, are substantially rectangular in horizontal section so that their flat outer faces 32 sealingly engage the corresponding flat-faced valve seats 16.

The inner opposed faces of the gate 26 and the segment 28 are formed in two angularly related planes which diverge transversely of the gate assembly 18 to from two sets of mutually wedging surfaces 34. The transverse proportions of the gate 26 and the segment 28 are such that when both sets of the inner wedging surfaces 34 are in contact, i. e. the gate and segment are mated, the transverse dimension of the gate assembly 18 is slightly less than the distance between the the valve seats 16. Hence, when the gate assembly 18 is thus contracted, sufficient clearance exists between the assembly and the valve seats 16 to enable the assembly to be moved freely and easily by the valve stem 24. Relative endwise displacement, however, of the gate 26 and the segment 28 from their mated position, in either direction along the line of travel of the assembly 18, results in a mutual wedging action between one of the two sets of the wedging surfaces 34. This wedging action is effective to expand the assembly 18 transversely and force the outer sealing faces 32 of the gate 26 and the segment 28 into tight sealing engagement with their respective valve seats 16. Such relative endwise displacement is imparted to the gate 26 and the segment 28 at both ends of travel of the assembly 18 by interior abutments 36 (only one of which is shown) in the housing 10. These abutments 36 are engaged by the corresponding ends of the segment 28 and arrest the travel thereof before the gate 26, impelled by the valve stem 24, reaches its final limit of travel. Hence, the gate assembly 18 is expanded into tight sealing engagement with the valve seats 16 in both the open and closed positions of the valve.

The structure thus far described is now well known, and is disclosed in greater detail in a patent to Laurent, Re. 20,101, dated September 8, 1936.

The flat face of each valve seat 16 is provided with a deep annular recess 38 (Figures 2, 3, and 4), rectangular in radial action, encircling the seat port 40. Floatingly mounted in each recess 38 is a pair of spaced concentric wiper rings 42 and 44 (Figures 2 and 3) of the same axial dimension, which dimension is less than the depth of the recess to form an annular chamber 45. Since the wiper ring construction is the same for each valve seat 16, a description of one will suffice for both. The outer ring 42 snugly but slidably engages the outer side wall 46 of the recess 38 while the inner ring 44 snugly but slidably engages the inner side wall 48 of the recess 38. The rings 42 and 44 are proportioned to have an annular space 50 of appreciable radial dimension therebetween, i. e. the space 50 is greater than would be formed by mere machined clearance between the rings. Interposed between the inner ends 52 of the wiper rings 42 and 44 and the bottom wall 54 of the recess 38 is a serpentine spring 56, flat in cross section, that yieldingly urges the rings into engagement with the corresponding sealing surface 32 of the gate assembly 18.

The annular portion 20 of the valve seat 16 is provided with an outer circumferential groove 58 which is in communication with the chamber 45 via a plurality of radial ports 60 in the annular portion 20. A lubricant passageway 62 extends through the housing wall opposite the groove 58 and is provided at its outer end with a pressure lubricant fitting 64, of any appropriate conventional design.

In order to lubricate and also increase the sealing effectiveness of the sealing surfaces of the valve, i. e. the cooperating surfaces of the valve seat 16 and the gate assembly 18, the chamber 45 initially is forcefully charged with lubricant via the fitting 64, passageway 62, groove 58, and ports 60. Lubricant then flows outwardly through the annular space 50 between the rings 42 and 44 into contact with the sealing surface 32 of the gate assembly 18. The annular space 50 separating the rings is of sufficient radial extent to permit ready flow of viscous lubricant therethrough. Hence, when the rings 42 and 44 are pressed back into the recess 38, by movement thereagainst of the corresponding sealing surface 32 of the gate assembly 18 during the expansion of the latter, lubricant is forced through the annular space 50 against the sealing surface of the gate assembly. Subsequent wiping movement of the gate assembly 18 against the rings 42 and 44 spreads the lubricant between the cooperating sealing surfaces of the valve seat 16 and the gate assembly 18.

Thus, the advantages of the scraping effect of a seal or wiper ring and of a large mass of grease held against the sealing surface of the gate assembly are both attained. Additionally, since the rings 42 and 44 contact the gate assembly 18 at all times, fluid from the line does not readily wash away the grease from the space 50 between the rings. In fact, the annular grease-retaining space 50 between the rings is exposed to line fluid only during the opening and closing movements of the valve, and any small quantity of grease washed away at that time from the outer or assembly-juxtaposed end of the annular space is rapidly replenished from the lubricant chamber 45 behind the rings by the normal movements of the gate assembly. Thus, because of the small grease losses inherent in the construction and also the "pumping" action of the rings 42 and 44 to replenish grease on the sealing surfaces of the gate assembly, the valve needs to be recharged with lubricant only infrequently. It also will be noted that the grease in the annular groove 58 assures a tight seal between the periphery of the annular portion 20 of the valve seat 16 and the wall of the counterbore 22 in which the seat is mounted.

With this construction and by means of a grease gun or the like, it is possible to build up considerable lubricant pressure in the lubricant chamber 45. This pressure acts against the inner ends or rear faces 52 of the rings to force the latter tightly against the sealing surfaces 32 of the gate assembly 18. Hence, should the lubricant charging pressure be excessive, a severe drag will exist between the gate assembly and the rings. In some instances this effect might bind the gate assembly 18 against movement.

In order to prevent or decrease this possibility, the area of contact between the rings 42 and 44 and the gate assembly 18 is confined to two radially-spaced narrow bands 66, one at the outer edge of the gate-assembly-contacting face of the outer ring 42 and the other at the inner edge of the corresponding face of the inner ring 44. In other words, the adjacent edges of the gate-assembly-contacting faces of the rings 42 and 44 are circumferentially cut away or recessed. The effect of this construction is to reduce the effective area of the rings acted upon by lubricant pressure to urge the rings into contact with the gate assembly. In another sense, the lubricant pressure acting on the rear faces 52 of the rings is counteracted by lubricant pressure acting on the bottoms of the circumferential edge recesses in the assembly-contacting faces of the rings. The net effect is to reduce considerably the force with which the rings 42 and 44 bear against the sealing surface 32 of the gate assembly 18, thus permitting the use of less force in moving the assembly to open and close the valve.

For example, and neglecting the transverse sectional area of the annular space 50 between the rings 42 and 44 as being substantially negligible: If the outer and inner diameters of the recess 38 are 14.75" and 14", respectively, the area of the rear face of the rings exposed to lubricant is 17 square inches. A coefficient of friction of .85 between the rings 42 and 44 and the sealing surface 32 of the gate assembly is usual. Assuming the test pressure of the valve is 3250 lbs./sq. in. and that a like lubricant pressure is therefore employed, the total force necessary to slide the gate assembly 18 against the rings 42 and 44 (neglecting any other forces) would be 17×3250×.85, or 46,962 lbs. However, by reason of the construction illustrated the effective area of the rings (of this size) acted upon by lubricant pressure to force the rings against the gate assembly may be reduced to 4 square inches. Hence, the corresponding force necessary to slide the gate assembly would be 4×3250×.85, or 11,050 lbs.

Modifications of the embodiment shown in Figure 2 are possible. For example, and as shown in Figure 3, the lubricant charging passageway 62 may lead to a circumferential groove 68 formed in the wall of the counterbore 22 instead of in the annular portion 20 of the valve seat 16.

In the modification shown in Figure 4 the annular space 70 formed by the bevelled outer end edge 72 of the annular portion 20 of the valve seat 16 has been utilized for distribution of lubricant from the charging passageway 62 to the chamber 45 via the ports 60. Such bevelled edge 72 is usual in valves of this type, both for facilitating assembly of the seats 16 in the counterbores 22 and for the interposition of sealing material in the annular space 70. Further, in this modification the serpentine spring 74 is circular in cross-section.

The wiper ring construction is also susceptible of variation. As shown in Figure 4, a single integral ring 76 snugly but slidably engages both the outer and inner sidewalls 46 and 48 of the recess 38. A plurality of ports 78 through the ring 76 provide communication between a circumferential lubricant groove or channel 80 in the gate-assembly-contacting end face of the ring and the chamber 45. As in the previously described modifications the bottom wall 82 of the groove 80 provides a pressure-effective area that reduces the force with which lubricant can press the ring 76 against the gate assembly 18.

It will thus be seen that the objects of this invention have been fully and effectively accomplished. It will be realized, however, that changes may be made in the specific embodiments illustrated and described to disclose the principles of the invention without departing from such principles. Therefore, this invention includes all modifications encompassed by the spirit and scope of the following claims.

I claim:

1. In a gate valve having a housing forming a valve chamber provided with aligned ports having opposed valve seats and a valve gate slideable between the seats, the combination comprising: means defining an annular recess in one of the seats and surrounding the corresponding port; floating ring means mounted in said recess and providing at least two concentric radially-spaced annular surfaces for sliding engagement with one face of the valve gate; means for introducing lubricant under pressure into said recess behind said ring means; and means defining a passage through said ring means for conducting lubricant from therebehind to the annular space between said concentric gate-engaging surfaces.

2. The structure defined in claim 1 in which the effective area of the ring means acted upon by lubricant pressure to urge said ring means against the valve gate is less than the maximum transverse sectional area of said ring means.

3. In a gate valve having a housing forming a valve chamber provided with aligned ports having opposed valve seats and a valve gate slideable between the seats, the combination comprising: means defining an annular recess in one of the seats and surrounding the corresponding port; floating ring means mounted in said recess and providing at least two concentric radially-spaced annular surfaces for sliding engagement with one face of the valve gate; means for introducing lubricant under pressure into said recess behind said ring means; and means defining a passage through said ring means for conducting lubricant from therebehind to the annular space between said concentric gate-engaging surfaces, the area of the gate-engaging annular surfaces being considerably less than the area of said ring means at the opposite end thereof exposed to lubricant in said recess.

4. In a gate valve having a housing forming a valve chamber provided with aligned ports having opposed valve seats and a valve gate slideable between the seats, the combination comprising: means defining an annular recess in one of the seats and surrounding the corresponding port; floating ring means mounted in said recess and providing at least two concentric radially-spaced annular surfaces for sliding engagement with one face of the valve gate; means for introducing lubricant under pressure into said recess behind said ring means; and means defining a passage through said ring means for conducting lubricant from therebehind to the annular space between said concentric gate-engaging surfaces, the area of said space exposed to the gate face being only slightly less than the area of said ring means at the opposite end thereof exposed to lubricant in said recess.

5. In a gate valve having a housing forming a valve chamber provided with aligned ports having opposed valve seats and an expansible valve gate slideable between the seats, the combination comprising: means defining an annular recess in one of the seats and surrounding the corresponding port; floating ring means mounted in said recess and providing at least two concentric radially-spaced annular surfaces for sliding engagement with one face of the valve gate; resilient means interposed between said ring means and the bottom of said recess for urging said ring means into engagement with the one gate face; means for introducing lubricant under pressure into said recess behind said ring means; and means defining a passage through said ring means for conducting lubricant from therebehind to the annular space between said concentric gate-engaging surfaces.

6. In a gate valve having a housing forming a valve chamber provided with aligned ports having opposed valve seats and a valve gate slideable between the seats, the combination comprising: means defining an annular recess in each of the seats and surrounding the corresponding port; floating ring means mounted in each said recess and providing at least two concentric radially-spaced annular surfaces for sliding engagement with a face of the valve gate; means for introducing lubricant under pressure into each of said recesses behind the ring means therein; and means defining a passage through each said ring means for conducting lubricant from therebehind to the annular space between the concentric gate-engaging surfaces of said ring means.

7. In a gate valve having a housing forming a valve chamber provided with aligned ports having opposed valve seats and a valve gate slideable between the seats, the combination comprising: means defining an annular recess in one of the seats and surrounding the corresponding port; a floating ring disposed in said recess for sliding engagement with a face of the valve gate; means defining an annular groove in the gate-engaging surface of said ring; means for introducing lubricant under pressure into said recess behind said ring; and a passageway through said ring for conducting lubricant from said recess to said ring groove.

8. The structure defined by claim 7 in which the area of the ring exposed to lubricant in the recess is only slightly greater than the area of the ring groove exposed to the gate face.

9. In the gate valve having a housing forming a valve chamber provided with aligned ports having opposed valve seats and a valve gate slideable between the seats, the combination comprising: means defining an annular recess in one of the seats and surrounding the corresponding port; a floating ring disposed in said recess for sliding engagement with a face of the valve gate; resilient means for urging said ring against the gate face; means defining an annular groove in the gate-engaging surface of said ring; means for introducing lubricant under pressure into said recess behind said ring; and a passageway through said ring for conducting lubricant from said recess to said ring groove.

10. In a gate valve having a housing forming a valve chamber provided with aligned ports having opposed valve seats and a valve gate slideable between the seats, the combination comprising: means defining an annular recess in one of the seats and surrounding the corresponding port; a pair of radially-spaced concentric outer and inner floating rings disposed in said recess for sliding engagement with a face of the valve gate, said outer and inner rings being in sliding engagement with the outer and inner sidewalls, respectively, of said recess; and means for introducing lubricant under pressure into said recess behind said rings, the lubricant passing to the gate face via the annular space between said rings.

11. The structure defined in claim 10 in which the gate-contacting face of the inner ring is provided with a circumferential recess at its outer edge and the gate-contacting face of the outer ring is provided with a circumferential recess at its inner edge.

12. In a valve, two relatively movable parts having cooperating sealing surfaces, one forming a valve member and the other a seat, and a pressure lubricating system for the valve including a recess in the sealing surface of one of said parts, floating means disposed in said recess and forming a portion of said sealing surfaces, a lubricant channel in the sealing surface of said floating means, means for introducing lubricant under pressure into said recess behind said floating means, and passageway means through the latter for conducting the lubricant from therebehind to said channel.

13. In a valve having two relatively movable parts forming cooperating sealing surfaces, movable insert means located in a lubricant chamber in one of said surfaces, said insert means having a lubricant channel in the outer sealing surface thereof and passageway means therethrough providing communication between said chamber and said channel, means for supplying lubricant under pressure to said chamber and means for resiliently urging said insert outwardly of the chamber.

14. A gate valve having a housing forming a valve chamber provided with aligned ports having opposed parallel valve seats; an expansible through conduit valve gate slideable between the seats to open and close the valve; an endless recess in each seat surrounding the corresponding port; wiper ring means floatingly mounted in each recess and having a lubricant channel in its gate-contacting surface; resilient means interposed between each said ring means and the bottom of its recess for urging said ring means outwardly; means for introducing lubricant under pressure to each said recess behind said ring means therein; and means defining a passageway through each said ring means providing communication between its lubricant channel and the lubricant in its recess.

15. In a gate valve having a housing forming a valve chamber provided with aligned ports having opposed valve seats and a valve gate slideable between the seats, the combination comprising: means defining an annular recess in each of the seats and surrounding the corresponding port; a pair of radially spaced concentric outer and inner floating rings disposed in each of said recesses for sliding engagement with a face of the valve gate, said outer and inner rings being in sliding engagement with the outer and inner side walls, respectively, of said recess; means for introducing lubricant under pressure into each of said recesses behind the ring means therein, the lubricant passing to the gate faces via the annular spaces between said rings.

References Cited in the file of this patent

UNITED STATES PATENTS

| | | |
|---|---|---|
| 703,583 | Hirt | July 1, 1902 |
| 1,476,344 | McGee | Dec. 4, 1923 |
| 2,030,458 | McKellar | Feb. 11, 1936 |
| 2,148,628 | Laurent | Feb. 28, 1939 |
| 2,570,413 | Volpin | Oct. 9, 1951 |
| 2,600,898 | Maxwell | June 17, 1952 |